United States Patent
Corcoran et al.

(10) Patent No.: US 6,572,911 B1
(45) Date of Patent: Jun. 3, 2003

(54) IMPINGEMENT OVEN WITH STEAM INJECTION AND METHOD OF BAKING DOUGH PRODUCTS

(75) Inventors: Karyl M. Corcoran, St. Anthony, MN (US); Thomas P. Kempf, Brooklyn Park, MN (US); Desmond Newbery, Grandville, MI (US)

(73) Assignee: The Pillsbury Company, Minneapolis, MN (US)

( * ) Notice: Subject to any disclaimer, the term of this patent is extended or adjusted under 35 U.S.C. 154(b) by 0 days.

(21) Appl. No.: 09/556,105

(22) Filed: Apr. 21, 2000

(51) Int. Cl.$^7$ .............................. A23L 1/01; A21B 1/00
(52) U.S. Cl. .................... 426/510; 426/523; 99/443 C; 99/386; 99/476; 99/477
(58) Field of Search .................... 99/443 C, 476, 99/386, 516, 477; 426/523, 549, 510, 511

(56) References Cited

U.S. PATENT DOCUMENTS

| | | | |
|---|---|---|---|
| 4,167,585 A | * 9/1979 | Caridis et al. | 426/233 |
| 4,701,340 A | * 10/1987 | Bratton et al. | 426/511 |
| 4,834,063 A | 5/1989 | Hwang et al. | 126/21 |
| 4,965,435 A | 10/1990 | Smith et al. | 219/388 |
| 5,075,120 A | * 12/1991 | Leary et al. | 426/233 |
| 5,243,899 A | * 9/1993 | Moshier et al. | 99/450.1 |
| 5,516,466 A | * 5/1996 | Schlesch et al. | 261/117 |
| 5,654,021 A | * 8/1997 | Burger | 426/94 |
| 5,676,044 A | * 10/1997 | Lara, Jr. | 99/331 |
| 5,804,243 A | * 9/1998 | Loh et al. | 426/522 |
| 5,875,705 A | * 3/1999 | Knost | 99/443 C |
| 5,934,178 A | * 8/1999 | Caridis et al. | 99/330 |
| 6,146,678 A | * 11/2000 | Caridis et al. | 426/510 |

FOREIGN PATENT DOCUMENTS

| | | | | |
|---|---|---|---|---|
| JP | 08275716 A | * 10/1996 | ............ | A21B/1/46 |
| WO | WO 89/00393 | 1/1989 | | |

OTHER PUBLICATIONS

PCT International Search Report, PCT/US01/12948.

* cited by examiner

*Primary Examiner*—Milton I. Cano
*Assistant Examiner*—Robert A Madsen
(74) *Attorney, Agent, or Firm*—Kagan Binder, PLLC

(57) ABSTRACT

An oven utilizes a convective heat transfer mechanism for cooking the food products where the oven provides heated gas in the form of columns or streams and which are directed to at least one surface of a food product within the oven. Moisture, in the form of steam, is introduced within the convective heat transfer mechanism. Thus, an effective moisture environment can be created at and around the surface of the food product that is cooked under the influence of the heated gas/steam columns or streams. More preferably, steam is introduced within the convective heat transfer mechanism for creating a moisture environment substantially surrounding the entire food product during its baking. Such an oven permits baking food products, in particular dough products, and even more particular bagel products, by a convective heat transfer mechanism that provides for quicker and more even cooking of the food product while providing for the making of whatever level of moisture is desired about the food product for imparting a desirable characteristic to the food product. For bagel products, in particular, desirable surface sheen and texture characteristics can be achieved The present invention is also directed to methods of cooking food products, in particular dough products, and even more particular bagel products, by way of such an oven.

34 Claims, 6 Drawing Sheets

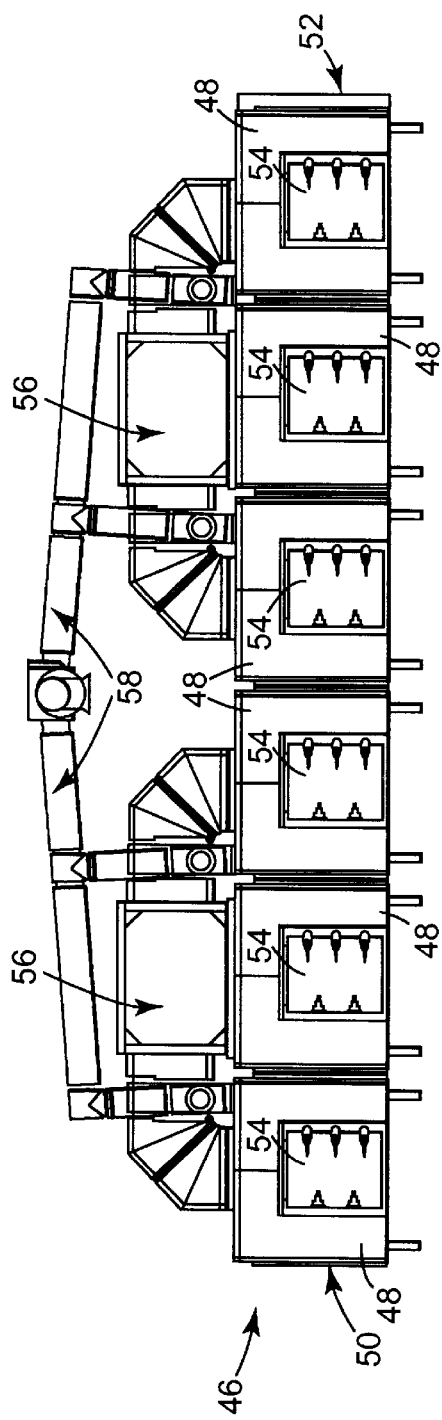
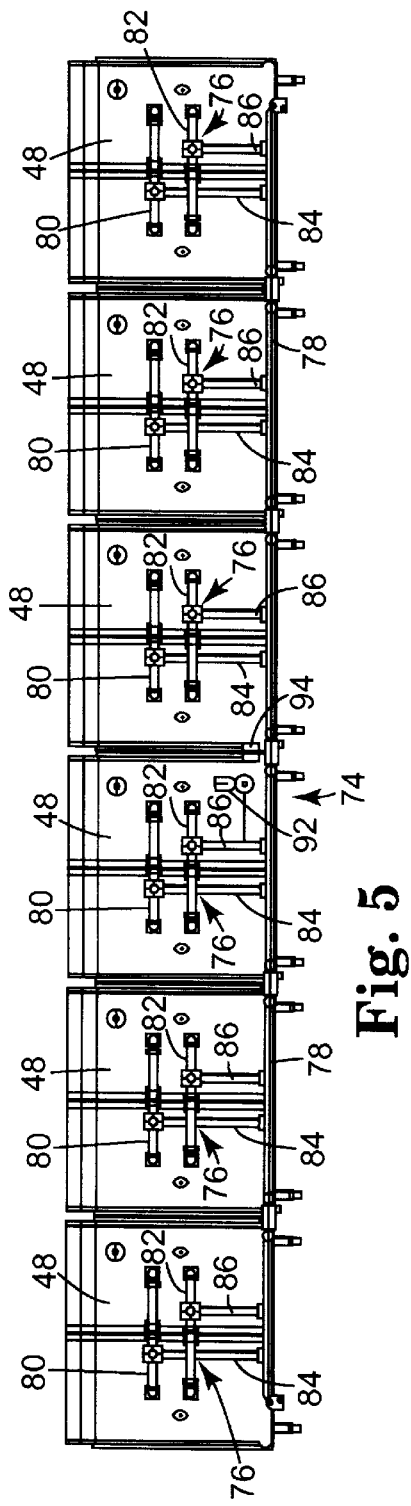
Fig. 4
Fig. 5

IMPINGEMENT OVEN WITH STEAM INJECTION AND METHOD OF BAKING DOUGH PRODUCTS

TECHNICAL FIELD

The present invention relates to ovens that are suitable for cooking food products, such as for baking dough products, and methods of cooking such food products where such ovens utilize heat convection at least in part in the cooking process, such as by forced heated gas that is directed to impinge upon the food product. In particular, the present invention is directed to such an oven apparatus and methods of cooking where steam is introduced within the convective heat transfer mechanism for imparting a desired cooking characteristic, such as in the case of a dough product a desired surface texture or sheen.

BACKGROUND OF THE INVENTION

Conventional dough products are cooked or baked in many different ways depending on the desired organoleptic characteristics that are desired for a particular dough product. Dough products, as used throughout this Application, means any food product that utilizes any formulation of a dough at least in part in making up the food product. Characteristics of the dough which may be attained based at least in part on the cooking technique include texture and sheen attributes of the dough surface or crust. Baking techniques, such as temperature, time and the heat transfer mechanism that is used, can also be at least partially responsible for characteristics of the dough product beneath its surface or crust, such as related to the cooked dough product density and texture. As examples, the cooked dough product may be dense and chewy or light and airy. These characteristics, of course, are also dependent on other dough features, such as the dough formulation.

The present invention was developed in particular for the baking of dough products that have a dense, chewy texture, and an exterior surface sheen. Examples of such dough products include bagels, soft pretzels, French bread, rye bread, sticky buns and the like. Such products may optionally comprise a filled dough product or be mixed or otherwise combined with other ingredients. The dough that is typically used to make such dough products generally includes flour, water and a leavening agent, preferably an active yeast culture. The dough may also include other optional ingredients, for example, sweeteners, flavorings, and fat products. The dough products can be filled with a variety of fillings, and such fillings are preferably substantially retained within the dough crust after processing.

Bagel products are characterized as having a dense, chewy texture and having an exterior sheen. As used throughout this application, a bagel product is meant to include all types of bagels and other products that incorporate or use similar dough and which similar texture and sheen characteristics are desired. Moreover, bagel products may include filled bagel products.

Traditionally, bagel products are prepared by simmering them in boiling water prior to baking. In particular, bagels are typically boiled for between and 30 and 120 seconds on each side thereof prior to baking. After boiling, the bagels may be permitted to drain for a short period followed by a baking cycle that conventionally comprises baking at 400° F. for about 25 minutes. During the boiling step, the bagel is believed to expand to its ultimate desired geometry. Then, upon baking, excess surface moisture is driven off and the crust setting takes place. No significant expansion is believed to occur during the baking step. Thus, the desired product geometry, flavor and texture is achieved.

As an alternative method of making bagel products, steam baking has been utilized to provide a similar result. In steam baking, a baking chamber is saturated with moist air or steam so that the surface of the bagel product is exposed to sufficient water for enough time to permit the dough to expand to its desired geometry and after which the crust can set. In other words, steam injection provides sufficient water to keep the bagel product in a moist environment for delaying the setting of the outer structure of the bagel product so that it can expand sufficiently before forming an outer shell. Such cooking also results in the desired texture and sheen attributes associated with such bagel products.

For example, a conventional rack oven can be provided with steam injection through associated steam coils. A suitable rack oven can be obtained, for example, from Gemini Bakery Equipment Company of Philadelphia, Pa. In such conventional baking chambers, sufficient moisture (i.e., steam) must be provided to fill the entire baking chamber to ensure that the desired moisture quantity is provided around the bagel product during cooking. In particular, that means that the entire oven baking chamber should be filled with an air/steam mixture to the saturation level of the steam. This technique, although effective, requires a high usage of steam (because the entire baking chamber is filled) thereby requiring a relatively large steam generation capacity. Furthermore, saturating the entire internal baking chamber of an oven with steam can very detrimentally affect the oven, particularly over the long term.

Yet another alternative for making bagel products is disclosed in U.S. Pat. No. 5,965,180 to Lonergan, which is commonly assigned to the assignee of the present invention and the disclosure of which is entirely incorporated herein by reference. Disclosed in the Lonergan patent are certain glazes that have been developed for the purpose of mimicking the effect of boiling or steam baking. The glazes are designed to maintain excess water on the bagel products surface for long enough to permit the dough to expand to its desired geometry prior to the crust setting and to make the desired chewy texture. With such glazes, the boiling step can be eliminated. By baking the bagel products with an applied glaze under otherwise normal baking conditions and in a conventional oven, certain desirable bagel characteristics can be attained. Such process, however, requires the time and cost requirements of the ingredients in making such a glaze and applying such a glaze to the product dough prior to being cooked.

Dough products other than the bagel products discussed above are known to be cooked in such conventional ovens without the provision of any steam at all. That is, many dough products are cooked without the presence of moisture or steam because they do not intend to have the texture and sheen attributes associated with bagel-like products. All sorts of conventional ovens (both commercial and household types) have been developed including a wide variety of different types of baking chambers that are suitable and adjustable for a very wide variety of dough products.

One specific type of oven that has been developed for commercial use has found acceptance in baking other dough products where speed of the baking is desired while maintaining other specific baking characteristics. Gas impingement baking ovens have been developed that rely on a convective heat transfer mechanism for quickly and accurately cooking dough products as they pass through the oven on a conveyor. Specifically, a typical impingement oven utilizes high velocity, low mass hot gas is directed at the food product through nozzles. This heated gas may be directed to impinge the food product from one or both sides thereof. If directed from both sides, the conveyor permits the gas to pass to impinge on the supported side of the food product. Columnar gas streams or jets are provided for impinge in one or both sides of the food product during the baking process. Nozzles or fingers having an array of nozzle orifices that extend over and/or under the food product transfer conveyor are utilized for providing a dispersed heated gas supply mechanism. The baking chamber's thereof may additionally be heated by other means, but preferably, the food product cooking is primarily accomplished by convective heat transfer from the heated gas columns or streams. Impingement ovens can be obtained, for example, from APV Baker Inc. of Grand Rapids, Mich., under the trade names "Jet Sweep" or "Enerjet."

In certain baking situations, it has been found useful to provide steam within the baking chamber of such impingement ovens to increase the moisture about a food product during its baking process. That is, a steam supply can be connected to provide steam within the baking chamber so as to provide a moist environment around the food products during baking, which baking is still primarily accomplished by the convective heat transfer of the gas columns or streams. However, achieving high levels of steam presence is particularly difficult within the baking chambers of such impingement ovens. As described above, high steam level presence (preferably to the level of saturation) is needed to achieve the preferable characteristics of bagel products. First of all, the baking chambers are relatively large because they cook food products as they are conveyed through the ovens and the baking chamber substantially extends the entire length that the food products are conveyed through the impingement oven. Thus, a large steam generation capacity is required. As above, exposing the internal oven mechanisms to high levels of moisture is generally not good for the oven mechanisms over time. Furthermore, the nature of impingement oven tends to force steam away from the food products during cooking. That is, the food products are affected mostly by the heated gas that is impinged thereon.

SUMMARY OF THE PRESENT INVENTION

The present invention overcomes the deficiencies and shortcomings of the prior art by providing techniques for creating an effective moisture environment around a food product during baking while the food product is baked in an oven that cooks the food product at least in part by a convective heat transfer mechanism. In particular, the present invention provides the ability to bake bagel products by a convective heat transfer oven within an effective moisture environment for creating desired surface sheen and texture characteristics.

An oven in accordance with a present invention utilizes a convective heat transfer mechanism for cooking the food products. Preferably, the oven comprises an impingement oven that utilizes heated gas provided in the form of columns or streams and which are directed to at least one surface of a food product within the oven. By the present invention, moisture, in the form of steam, is introduced within the convective heat transfer mechanism. Thus, an effective moisture environment can be created at and around the surface of the food product that is cooked under the influence of the heated gas/steam columns or streams. More preferably, steam is introduced within the convective heat transfer mechanism for creating a moisture environment substantially surrounding the entire food product during its baking.

Such an oven is advantageous in that food products, in particular dough products, and even more particular bagel products, can be baked by a convective heat transfer mechanism that provides for quicker and more even cooking of the food product while providing for the making of whatever level of moisture is desired about at least part of the food product for imparting a desirable characteristic to the food product. In the case of dough products, moisture may be desirable for any number of reasons during the baking step. With bagel products, as detailed above in the Background section of the subject application, bagel product surface sheen and texture can be achieved by providing an effective moisture environment that mimics a saturated steam environment of a conventional oven chamber. This permits the dough expansion that is desired to create the desired bagel product geometry and thereafter the baking of the dough beneath the surface or crust to create the chewy nature of the dough.

The present invention is also directed to methods of cooking food products, in particular dough products, and even more particular bagel products. Such methods primarily conduct baking by providing a convective heat transfer to the food product. In accordance with present invention, moisture is introduced within the convective heat transfer mechanism during the convective heating step. Thereby, an effective moisture environment is created about at least a portion of the food product during its baking so that a characteristic of the food product can be achieved that is associated with the provision of an effective level of moisture at a surface of the food product. In the case of a bagel product, desirable bagel product surface sheen and texture can be achieved and the bagel dough can thereafter be cooked as also desired to create its chewy nature.

Moisture is preferably introduced as steam within the heated gas of the convective heat transfer mechanism. The heated gas may comprise air or any other carrier gas capable of heat transfer and carrying moisture. More preferably, the steam is introduced within the heated gas prior to it being ejected from its supply nozzle that is used to create the heated gas jets or streams for impinging on the food product. Thus, by creating an effective steam environment, preferably as high as the level of saturation for bagel products, with the heated gas prior to its ejection, an environment having a high water to gas ratio with highly saturated conditions can be focused at the food product surface. The particular advantage is that the steam is focused at the food product surface so that moisture at the food product surface can be maximized while the steam levels within the overall baking chamber can be minimized. The high water to gas ratio environment can be substantially provided at and about the food product without having to create a highly saturated environment within the entire baking chamber. Appropriate conditions with respect to temperature and moisture are created in the micro-environment of higher humidity near the product surface. Otherwise, the baking chamber need not experience highly saturated conditions throughout. This, of course, is better for the oven mechanisms in the long-term and permits the high throughput and reduced baking dwell time advantages of impingement baking to be achieved while making a food product that advantageously achieves desired moisture related characteristics. Additionally, steam usage is minimized.

By delivering the steam and creating the high water to gas ratio environment near the product surface, there is no need to create a homogeneous environment of high humidity within the entire baking chamber. It is also possible to selectively provide the steam to the nozzles of the impingement oven. This creates greater flexibility to the oven design. For example, with a bagel product, steam may be introduced within the nozzles of the initial cooking segment of the oven to achieve desired results early on in the baking cycle, while other baking zones, such as downstream of an initial section, can be otherwise controlled. This is advantageously permitted in that high humidity zones are merely created in the micro-environment about a food product in only the desired zone or zones of one or more stages of an impingement oven. With greater flexibility in designing the impingement oven, greater flexibility in terms of generating food products with varied attributes, such as crust texture and surface sheen, can be achieved.

The aforementioned advantages of the present invention are achieved by an apparatus for heating and cooking food products that utilizes convective heat transfer as a manner of providing heat to the food product, where the apparatus includes an oven chamber within which a food product can be positioned for heating thereof, a supply nozzle for connection to a heated gas supply, the supply nozzle including a receiving chamber within which heated gas can enter from the heated gas supply and at least one fluid directional opening from which heated gas can be ejected toward a food product that is supported in position within the oven chamber, and a steam injector connectable to a steam supply, the steam injector including at least one opening that is positioned relative to the receiving chamber of the supply nozzle so that steam can be injected into the receiving chamber of the supply nozzle. As a result, heated gas and steam can be provided at the same time to the receiving chamber of the supply nozzle so that the heated gas and steam can mix together prior to being ejected from the fluid directional opening of the supply nozzle toward the food product and the heated gas and steam mixture can be utilized for convective heat transfer for heating the food product.

Preferably, the supply nozzle is an impingement nozzle that has a plurality of fluid directional openings so that heated gas and steam can be ejected toward the food product while steam is injected into the impingement nozzle by a steam nozzle that extends therein. Many different types of arrangements are contemplated utilizing plural impingement nozzles, some or all of which may have steam injection. Moreover, oven sections, modules and cooking zones are contemplated that may be arranged in any number of ways for heating a food product according to any particular application. Also, a steam distribution system is preferably provided that is connectable to a steam supply and that interconnects with the steam nozzles of the oven chambers.

The aforementioned advantages the present invention are also achieved by a method of heating a food product by convective heat transfer comprising the steps of supporting a food product within an oven chamber, and heating the food product by convective heat transfer within a moisture environment by impinging at least a portion of the food product by a fluid stream that is directed at the food product by an impingement nozzle, the fluid stream comprising a heated gas and steam mixture. The method preferably further includes the steps of supplying heated gas to a receiving chamber of the impingement nozzle, and injecting steam from a steam injector into the receiving chamber of the impingement nozzle while the heated gas is supplied to the receiving chamber of the supply nozzle so as to provide the heated gas and steam mixture. The method of the present invention is particularly suitable as a method of cooking a dough product, and more particularly to a method of cooking a bagel product.

BRIEF DESCRIPTION OF THE DRAWINGS

FIG. 4 is a front side view of a multi-section impingement oven system comprising two oven modules in line and illustrating an airflow control system having a heated gas supply system for providing hot gas to the impingement nozzles within specific sections of the multi-section impingement oven system;

FIG. 5 is a rear side view of the multi-section impingement oven system of FIG. 4, but with the heated gas supply system removed, and illustrating a steam distribution system that, as illustrated, delivers steam to plural sections of the multi-section impingement oven system;

DETAILED DESCRIPTION OF THE PREFERRED EMBODIMENTS

Figure 1:
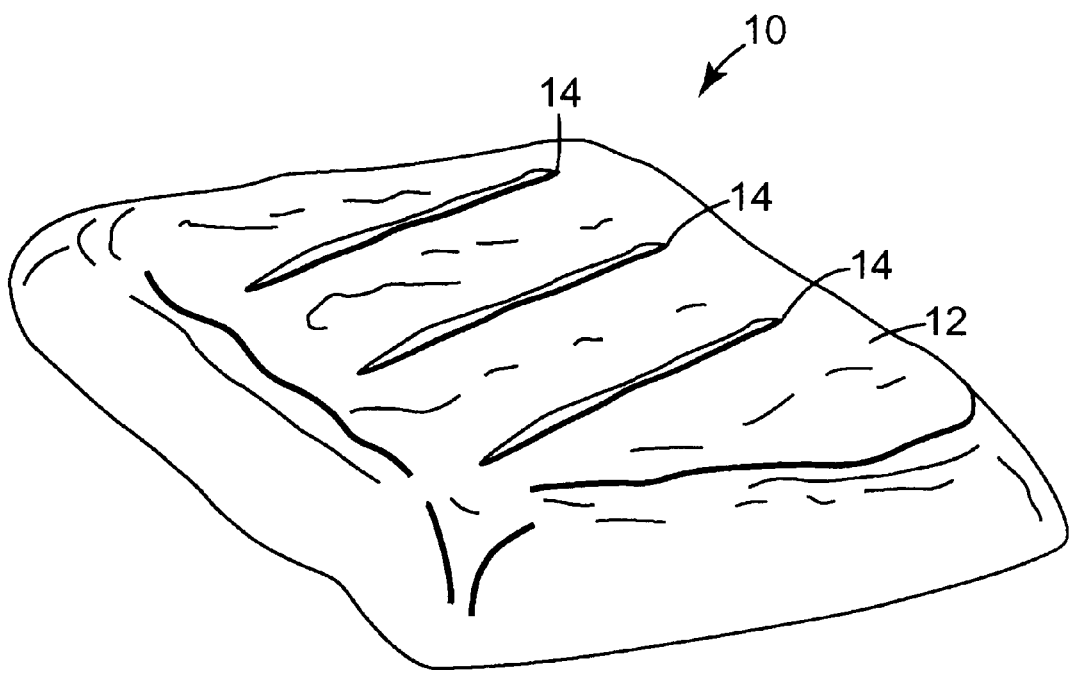
FIG. 1 is a perspective view of a filled bagel product, which is provided as an example of a food product, in particular a dough product, that can be cooked in accordance with the apparatus and methods of the present invention.

The present invention is directed to apparatus and methods for cooking food products, in particular dough products, and even more particular bagel products, by way of an oven cooking chamber that utilizes a convective heat transfer mechanism as a heat supply source to the food product as is provided within the oven cooking chamber. Preferably, the convective heat transfer mechanism includes the use of heated gas that is directed to the food product as provided within oven cooking chamber. The heated gas may comprise air or any other carrier gas capable of heat transfer and carrying moisture. The food product may be supported in any conventional manner within the oven cooking chamber, which support may include any mechanisms or means for moving the food product through the oven cooking chamber. Preferably, the oven cooking chamber is part of a oven system for making commercial food products where high throughput baking requirements can be met with high cooking efficiency.

In particular, the present invention is directed to apparatus and methods for cooking food products where an effective moisture environment is created about the food product during its baking within the oven cooking chamber. Preferably, the moisture environment is created about the food product in a way to substantially mimic a cooking environment where the food product is boiled in water. As set out in the Background section of the subject application, a number of techniques have been developed to mimic within an oven chamber a boiling method of cooking; however, the present invention is directed to a manner of doing so within an oven cooking chamber that utilizes a convective heat transfer mechanism for providing heat transfer to the food product therein.

Although the present invention is applicable to any food product where it is desired to cook the food product within an environment including an effective amount of moisture at or around the food product during at least a part of its cooking process, the present invention is more applicable to dough products wherein such dough products are desirably baked in the presence of an effective amount of moisture to attain a characteristic of the dough product. Characteristics of dough products which may be attained based on the cooking technique, such as whether cooking is conducted in the presence of moisture or not, include texture and sheen attributes of the dough surface or crust.

The present invention is most applicable to bagel products where it is desired to provide a product having a dense, chewy texture with an exterior surface sheen, such as, for example, bagels, pretzels, French bread, rye bread, sticky buns and the like. These products may optionally comprise filled dough products or be mixed or otherwise combined with other ingredients. Dough that is typically used to make such dough products generally include flour, water and a leavening agent, preferably an active yeast culture. The dough may also include other optional ingredients, for example, sweeteners, flavorings, and fat products. The dough products can be filled with a variety of fillings, and such fillings are preferably substantially retained within the dough crust after processing. Bagel products are characterized as having a dense, chewy texture and having an exterior sheen.

A specific example of a filled bagel product to which the present invention is applicable is illustrated in FIG. 1. The filled bagel product 10 comprises a food product that is designed specifically for reheating by consumers within a typical household toaster and is preferably sized and shaped for such purpose. As shown, the filled bagel product 10 can be generally rectangular and of a thickness facilitating such use. The filled bagel product 10 comprises a dough layer 12 that preferably substantially envelopes filling that is provided as an internal layer (not shown). Vents 14 are preferably provided through a top surface of the dough layer 12 to facilitate cooking and for aesthetic reasons. The illustrated filled bagel product 10, including methods and techniques for making such a filled bagel product is the subject of currently co-pending and co-assigned U.S. patent application Ser. No. 09/432,946, filed Nov. 3, 1999, and entitled "Baked Dough Products", the entire disclosure of which is incorporated fully within this application by reference. It is also understood that the cooking or baking step that is utilized in making such a filled bagel product, to which step the present invention is directed, is but one part of the preparing process in making such a filled bagel product. Such other preferable processing steps and methods are disclosed as well in co-pending U.S. patent application Ser. No. 09/432,946.

With reference to the figures of the subject application, wherein like elements are labeled with like numerals throughout the several figures, apparatus and methods for cooking or baking a food product, such as the filled bagel product 10, are hereinafter described. The filled bagel product 10 is but one specific food product to which the present invention is applicable and it is understood that any food product which may benefit from a moisture environment during cooking may be cooked in accordance with the apparatus and methods of the present invention. That is, where any portion of a food product may benefit from exposure to a moisture environment during cooking, the present invention may be applicable. The level of moisture within a particular moisture environment provided about at least a portion of the food product during cooking may be provided and controlled in accordance with present invention as well. For the making of bagel products, such as the filled bagel product 10, it is preferable that the moisture environment about the bagel product substantially surround the bagel product and be of a high moisture level. The moisture level refers to the amount of moisture within the gas, which may be expressed as a moisture to gas ratio. For a bagel product, a high moisture to gas ratio environment is preferred, which environment also exhibits saturated moisture conditions. For explanation purposes, the following description of the apparatus and methods in accordance with present invention are described as particularly applicable to the filled bagel product 10 of FIG. 1.

Figure 2:
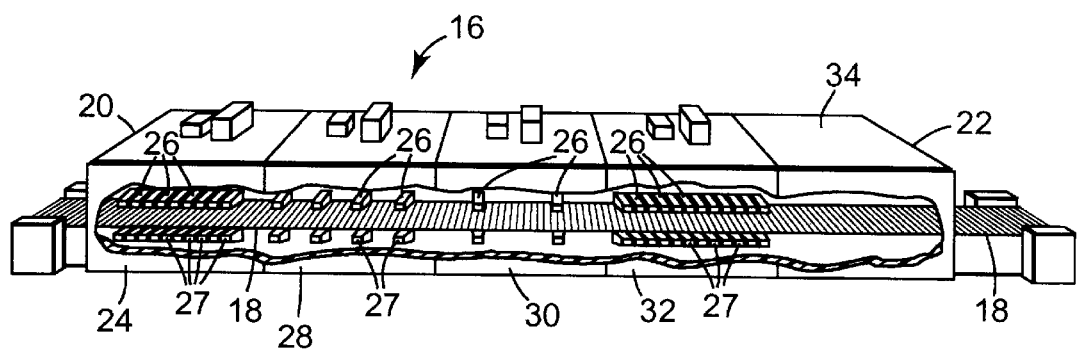
FIG. 2 is a partial cut away perspective view of a multizone impingement oven system with a conveyor system for moving food product through the impingement oven system.

An impingement oven system 16 is illustrated in FIG. 2. The impingement oven system 16 is a multizone impingement oven system through which a conveyor 18 is operatively provided as a food support mechanism and for moving food product through the entire impingement oven system 16. That is, food product can be provided on a surface of the conveyor 18 so as to enter a first side 20 of the impingement oven system 16 and to exit a second side 22 of the impingement oven 16 after the food product is cooked. The conveyor 18 may comprise any conventional or developed mechanism for transporting a food product through the impingement oven system 16. It is further preferable that the conveyor 18 be controllable for adjustably determining the speed that the food product will move through the impingement oven system 16 as desired depending on any particular application for cooking any particular food product. In ovens where movement is not need during the baking process or where movement is otherwise provided (such as manually), the supporting structure need not have any capability to move the food product. Any structure capable of merely supporting a food product in a cooking position is contemplated.

The impingement oven system 16 may comprise any number of oven sections and/or zones (multiple open sections may make up a zone) that together make up the entire impingement oven system 16. Many different types of oven zones are known and may be defined in accordance with the present invention, a number of such examples of which are noted hereinafter. The following zone descriptions are provided sequentially in the machine direction of the impingement oven system 16 starting from the first end 20 to the second end 22 thereof.

An intensive zone 24 is initially provided adjacent the first end 20 of the impingement oven system 16. Zone 24 is considered intensive because of the lineal density of heated gas supply nozzles that are connected to a heated gas supply and provided within its internal oven chamber. Specifically, heated gas is preferably supplied by way of upper impingement nozzles 26 and lower impingement nozzles 27 that are arranged and supported above and below the food support position, such as defined by the conveyor 18. For impingement nozzles 26 and 27 of a given size, this lineal density can be expressed in terms of the center-to-center spacing between adjacent impingement nozzles 26 or 27. Impingement nozzles 26 and 27 are preferably provided in matched pairs above and below the conveyor 18 within the intensive zone 24. The impingement nozzles 26 and 27 are positioned substantially right next to one another in the machine direction through the intensive zone 24 both above and below the conveyor 18. That is, the lineal density of impingement nozzles 26 and 27 is substantially maximized. The impingement nozzles 26 and 27, which will be described in greater detail the low, include fluid directional openings or impingement orifices that fluidically connect with internal chambers thereof that are in turn supplied with heated gas that is effective for cooking food product supported on conveyor 18.

A semi-intensive zone 28 is shown as sequentially provided after the intensive zone 24. The main difference between intensive zone 24 and the semi-intensive zone 28 is the lineal density and number of impingement nozzles 26 and 27 that are provided within its internal oven chamber. That is, greater center-to-center spacing is provided in the machine direction between adjacent upper impingement nozzles 26 and lower impingement nozzles 27. By having less impingement nozzles 26 and 27, assuming a similar heated gas supply rate, food product is subjected to less heat transfer in the semi-intensive zone 28 than in the intensive zone 24. This is because the heat transfer provided to the food product is primarily, if not substantially completely, a convective heat transfer mechanism provided by gasflow directed from the impingement nozzles 26 and 27.

Next, an even-bake zone 30 is shown. Again, this even-bake zone 30 is defined by the lineal density of the upper impingement nozzles 26 and lower impingement nozzles 27 that are encountered as a food product passes through the internal oven chamber of this even-bake zone 30. As shown, even fewer impingement nozzles 26 and 27 are provided than in the semi-intensive zone 28 thereby providing less heat transfer by convection to the food product as it passes through the internal oven chamber of the even-bake zone 30.

A second intensive zone 32 is shown sequentially after the even-bake zone 30. The purpose of this second intensive zone 32 is to again provide an intensive heat transfer by convection to the food product as it passes through this second intensive zone 32.

The last illustrated zone comprises a tempering zone 34. The tempering zone 34 is illustrated without any upper impingement nozzles 26 or lower impingement nozzles 27 so that no convective heat transfer is specifically provided or directed to the food product from any upper impingement nozzle 26 or lower impingement nozzle 27. This tempering zone may not be heated at all, it may be otherwise heated or it may rely on heat that is transferred from an adjacent zone for some heat.

It is understood that other zones can easily be created based on the above concept. That is, zones of different natures can be created by modifying the lineal density of the upper impingement nozzles 26 and/or lower impingement nozzles 27 that are encountered within an internal chamber of any particular oven zone.

Figure 3:
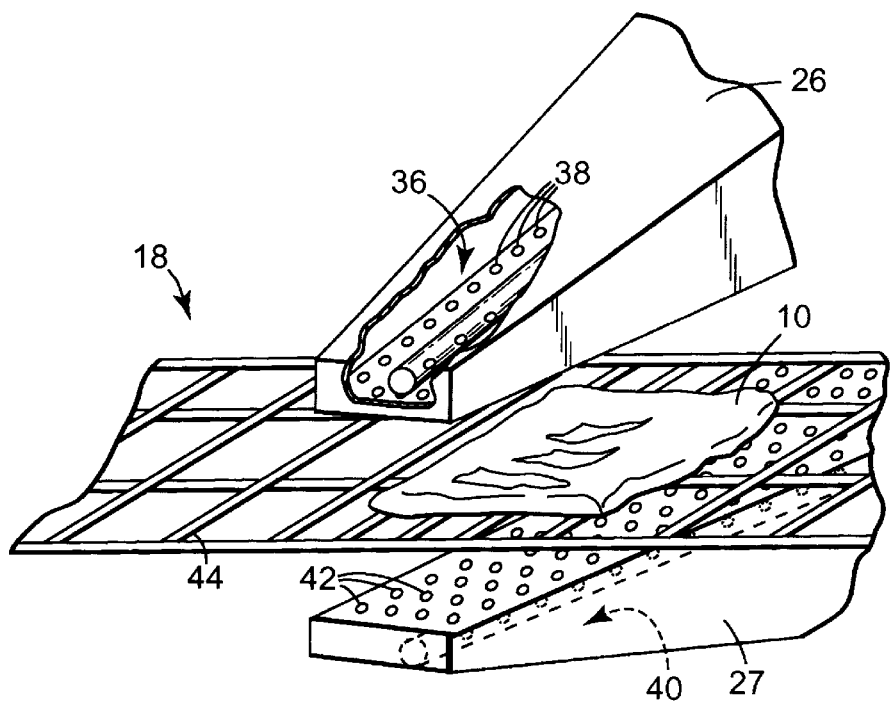
FIG. 3 is a partial perspective view showing a pair of opposed hot gas impingement nozzles with a food product, and in particular a filled bagel product, positioned on a conveyor in between the impingement nozzles within the impingement oven system of FIG. 2.

Furthermore, it may be desirable for a particular application to only provide hot gas impingement from only one of the upper and lower sides, in which case only one side would be provided with impingement nozzles 26 or 27. Such a one-sided arrangement can be varied as the food product is moved along the conveyor 18. That is, one zone or a partial zone can provide hot gas from one side and then switch to the other. In any case where it is desirable to impinge the food product from the lower side, the conveyor 18 or other moving support should permit the hot gas jets to impinge directly on at least some portion of the food product. A conveyor 18 could thus comprise an open mesh web or the like, as illustrated in FIG. 3 at 44.

It is also contemplated to modify any one or all of the defined zones by increasing or decreasing its lineal length in the machine direction of the impingement oven system 16. This can easily be accomplished by adding or removing oven sections, as described in greater detail below, from any particular oven zone. Changing the lineal length of the zone is directly related to the time that the food product will spend passing through that zone assuming a single conveying system that moves the food product through the impingement oven system 16 at a constant speed. Of course, timing aspects can be modified as well by using multiple conveying systems of different controlled speeds.

Moreover, the nature of the impingement oven system 16 can be changed by arranging the oven zones for a particular cooking application and/or by providing more or less component zones to make up the impingement oven system 16. For example, for certain foods it may be desirable to provide the multiple intensive zones such as illustrated in FIG. 2 within zones 24 and 32. For other food products, only an initial intensive zone may be desired. Others may require more than one intensive zone in a row or that the oven comprise only one type of zone. Or, for that matter, it may be that no intensive zone is required. Any combination of these and other zones is contemplated to be used in accordance with present invention.

As set out above, the present invention is specifically directed to any oven of the type that utilizes a convection heat transfer mechanism for cooking a food product. Preferably, the convection heat transfer mechanism is the primary mechanism of heat transfer to the food product. However, it is contemplated that other baking or cooking techniques can be combined with the convection heat transfer mechanism, such as heat transferred by radiation or conduction. Moreover, microwave and/or infrared cooking mechanisms may also be utilized as conventionally known hereinafter developed.

Of convection ovens, impingement ovens are particularly preferred because they have established the ability to cook food products, and in particular dough products, quicker and with higher throughput than other methods. Impingement ovens operate on the principal of supplying heated gas and directing this heated gas at sufficiently high velocity and in the form of columnar jets or streams to impinge on surfaces of a food product. The heated gas is supplied at a sufficiently high velocity so that it comes into direct contact with the food product surface. Furthermore, even treatment of the food product through the system can be assured based upon the product movement through the system at a predetermined speed. Cooking controlability and variability for particular applications maximizes an impingement oven's uses for many different types of commercial baking operations.

As shown in FIG. 3, each upper impingement nozzle 26 (only one of which is shown) preferably has an internal chamber 36 defined therein, the purpose for which is to receive hot gas that is supplied to each upper impingement nozzle 26 and from which heated gas is to be ejected from fluid directional nozzle orifices 38. The nozzle orifices 38 provide the fluidic connection from the internal chamber 36 and define and direct the preferably columnar gas streams or jets that exit from each upper impingement nozzle 26. Moreover, the nozzle orifices 38 are preferably arranged in any way, such as in a regular pattern, for specifically directing hot gas to the filled bagel product 10 as needed for cooking. Likewise, the lower impingement nozzles 27 include an internal chamber 40 operatively connected with the hot gas source and from which heated gas can be expelled by way of fluid directional nozzle orifices 42. Nozzle orifices 42 may be provided in a similar or different pattern, or as otherwise desired, to define and direct the preferably columnar heated gas streams or jets for impinging on the filled bagel product 10 from its bottom side as supported by the open mesh 44 of conveyor 18. In the matched pair arrangement illustrated in FIG. 3 of upper and lower impingement nozzles 26 and 27, the filled bagel product 10 is cooked from both sides at the same time as it passes between the upper and lower impingement nozzles 26 and 27, respectively.

As shown in FIG. 4, an impingement oven system 46 comprises six oven portions. As illustrated, the oven system 46 makes up a single zone of an impingement oven (i.e. each portion is the same zone type); however, such an illustration could be used to represent portions that make up more than one oven zone, such as the impingement oven system 16 of FIG. 2. Each oven portion comprises an oven section 48 that is supported in position and which are connectable together to define the impingement oven system 46. As above, these oven sections 48 may be the same or dissimilar from one or more of any other oven section 48 for defining the sequential cooking that will occur as a food product is conveyed from a first side 50 to a second side 52 of the impingement oven system 46. Each oven section 48 is also shown with an access door 54 for providing access to the internal chambers to each of the oven sections 48 for cleaning, maintenance, or other purposes, as desired.

Also illustrated in FIG. 4 are heated gas supply systems 56 (two independent systems are illustrated) and an gas exhaust system 58. Together, the heated gas supply systems 56 and the exhaust system 58 control gas flow through the internal chambers of each oven section 48. The heated gas supply systems 56 are also operatively connected with the upper and lower impingement nozzles 26 and 27, respectively, as described below. The oven sections 48 that are connected together by virtue of having a common heated gas supply are considered an oven module. In this case, as shown, two modules, each comprising three sections, make up a single oven zone.

Figure 6:
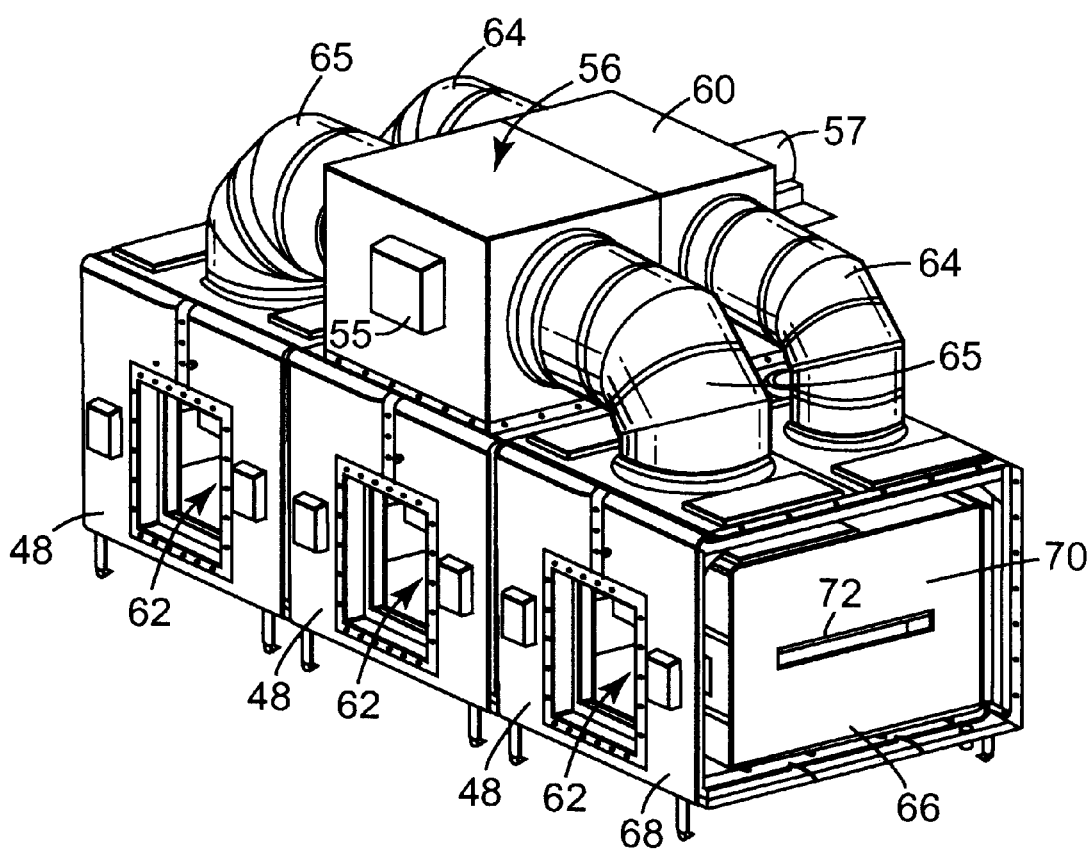
FIG. 6 is a perspective view of one module of the multi-section impingement oven system of FIG. 4 and with access doors of each section removed to show the internal chamber of the oven sections.

In FIG. 6, one module, or one-half of the impingement oven system 46, is illustrated with its access doors 54 and the exhaust system 58 removed. The heated gas supply system 56, which itself does not form a particular part of the present invention, generally provides a housing 60 within which a heated gas plenum (not shown) is defined from which heated gas fluidically connects to the internal chambers 62 of each oven section 48. The heated gas supply system 56 may be a direct gas heating system or an indirect gas heating system, and preferably it is operatively associated with a means, such as a burner 55, for heating the gas within the plenum that is defined by housing 60. A fan 57 provides the motive means to force the heated gas to the oven sections 48. In the case of the center oven section 48, heated gas fluid flow may be direct from the plenum within the housing 60 through the upper structure thereof. For supplying the heated gas to the oven sections 48 to either side thereof, conduits 64 and 65 operatively provide the fluid connection.

As also shown in FIG. 6, this illustrated oven construction utilizes for each oven section 48 an oven chamber 66 that is operatively supported with respect to an oven housing 68. The oven chambers 66 define the cooking chambers within which the upper and lower impingement nozzles are provided and also preferably include end walls 70 for effectively sectioning off one oven section 48 from another so that the appropriate cooking zones can be provided. End walls may not be desirable, for example, for joined sections within a same oven zone. A slot 72 or any other sized and shaped opening permits the conveyor 18 and food product to pass from one oven section 48 to another.

Figure 8:
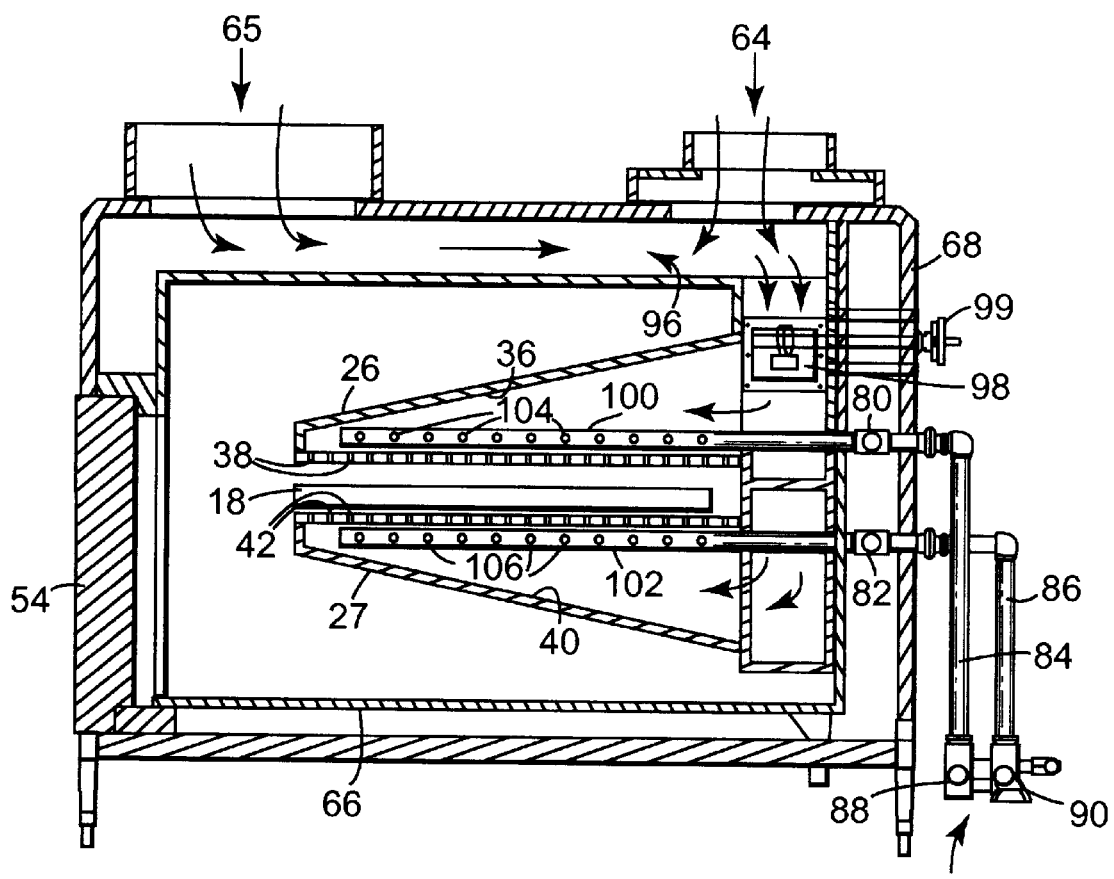
FIG. 8 is a cross-sectional view taken through one oven section of a multi-section impingement oven system, such a shown in FIGS. 4–7, illustrating upper and lower impingement nozzles connected with a heated gas supply and upper and lower steam supply nozzles within the upper and lower impingement nozzles and which are connected with the steam distribution system.

In addition to providing the heated gas to the upper and lower impingement nozzles 26 and 27, as described above, a steam distribution system 74 is provided in accordance with the present invention. As shown in FIG. 5, the steam distribution system 74 may extend over the entire length of the impingement oven system 46 in order to provide a steam supply within the oven chambers of each oven section 48. Since the illustrated oven system 46 comprises a single oven zone, all of the sections are preferably connected to the steam distribution system 74 similarly. The steam distribution system 74 can be generally divided into oven section distribution sections 76 and a distribution manifold section 78 interconnecting the oven section distribution sections 76. Each oven section distribution sections 76 may further be divided into an upper manifold 80 and a lower manifold 82. Each upper manifold 80 is fluidically connected with the distribution manifold 78 by a conduit 84 and each lower manifold 82 is connected with the distribution manifold 78 by a conduit 86. The distribution manifold 78 itself may comprise a single conduit to which each of conduits 84 and 86 are attached for fluid communication, or the distribution manifold 78 may comprise separate distribution conduits 88 and 90, as shown in FIG. 8. Distribution conduit 88 is shown connected with the conduits 84 that provide fluid communication to the upper manifolds 80. The distribution conduit 90 is connected by the conduits 86 to the lower manifolds 82. This way, the upper and lower manifolds 80 and 82 can be provided with different volumes and/or pressures of steam as controlled by upper and lower control valves 92 and 94, respectively, shown in FIG. 5. One or both distribution conduits 88 and 90 of the distribution manifold 78 are further operatively connected to a steam generation source (not shown) which may be conventional in nature or as hereinafter developed. It is also understood that the structure and nature of such a steam distribution system 74 can vary greatly. Steam pressures are based on the fluid distribution system specifications. What is important is that sufficient quantities of steam are provided to the impingement nozzles based upon the needs of a particular cooking application (e.g. to create saturated steam conditions for baking a bagel product).

A key aspect of the present invention is the moisture, by way of the steam, that is directly provided into the convective heat mechanism that is utilized as a heat transfer means within any oven in accordance with the present invention. That is, it is desirable to provide the steam in a way so that it becomes part of the heat transfer mechanism that is used in providing the convective heat transfer. This being in contrast to simply filling an oven chamber with an gas/steam mixture.

As shown in FIG. 8, this aspect of the present invention is accomplished by supplying steam directly within the internal chambers 26 and 40 of the upper and lower impingement nozzles 26 and 27, respectively. As illustrated, each upper impingement nozzle 26 can be operatively connected to and supported by a hot gas supply duct 96 formed as part of the oven chamber 66. This hot gas supply duct 96 is in turn fluidically connected to the hot gas supply conduits 64 and 65 of the heated gas supply system 56. Likewise, each lower impingement nozzle 27 may as well be operatively supported by the same hot gas supply duct 96 as provided as part of the oven chamber 66. Preferably, a damper 98 is also operatively supported to divide the gas flow from the hot gas supply duct 96 between the upper and lower impingement nozzles 26 and 27, respectively. To do this, the hot gas supply duct 96 is conventionally partitioned into two sections with one section communicating to the internal chamber 36 of the upper impingement nozzles 26 while the other partitioned section communicates with the internal chamber 40 of the lower impingement nozzles. Within the partition, the damper 98 provides controllable fluid flow between the partitioned section so as to adjust the fluid flow between the upper and lower impingement nozzles 26 and 27, respectively. An adjustment knob 99 is also preferably provided for controlling the position of the damper 98 and thus selectively dividing gas flow between the upper impingement nozzle 26 and the lower impingement nozzle 27. The hot gas supply duct 96, damper 98 and control 99 can be provided in accordance with any known or developed technique for providing the gas flow functionality.

In order to inject steam from the upper and lower manifolds 80 and 82, respectively, within the internal chambers 36 and 40, respectively, steam nozzles 100 and 102 are provided as steam injectors. Specifically, an upper steam nozzle 100 is provided within each upper impingement nozzle 26 from which gas/steam cooking is desired. That is, steam nozzles need be provided only where it is desirable that steam be mixed with and ejected from that particular impingement nozzle. Lower steam nozzles 102 extend within the lower impingement nozzles 27, in a same manner, and as desired. The steam nozzles 100 and 102 are provided by passing through the walls of the hot gas supply duct 96 and the oven chamber 66 through openings there through that are preferably provided with effective seals or sealant so as not to affect gas flow through the hot gas supply duct 96. Upper steam nozzles 100 are connected for fluid communication with the upper manifold 80. Lower steam nozzles 102 are connected for fluid communication with the lower manifold 82. A single upper manifold 80 and/or lower manifold 82 may supply multiple impingement nozzles 26 or 27 depending on how many such impingement nozzles are provided within a particular oven section 48 that is serviced by a particular upper and/or lower manifold 80 and 82. It is also contemplated that steam control valves may be provided between the conduits 84 and 86 and the upper and lower manifolds 80 and 82. In addition, or instead of, control valves may be provided to control fluid flow between the upper and lower manifolds 80 and 82 and the individual steam nozzles 100 and 102, respectively.

Each steam nozzle 100 and 102 preferably extends substantially within each upper and lower impingement nozzle 26 and 27 so that steam is effectively provided throughout the respective internal chambers 36 and 40 to facilitate mixing with the heated gas. Moreover, openings 104 and 106, respectively, are preferably provided along the lengths of the steam nozzles 100 and 102 along the portions thereof that lie within the respective internal chambers 36 and 40 of the upper and lower impingement nozzles 26 and 27. Again, this is for providing good steam distribution and mixing within the entire internal chambers 36 and 40. The openings 104 and 106 of the respective steam nozzles 100 and 102 can be provided in any pattern or from multiple circumferential locations to enhance steam distribution as desired. Then, under the gas flow principals controlled predominantly by the heated gas flow volume and pressure to and within the hot gas supply duct 96, heated impingement gas that is mixed with steam can be ejected from the fluid directional nozzle orifices 38 and 42 as jets or streams that can be utilized in cooking a food product. By controlling the injection of steam within each internal chamber 36 and 40, a high moisture content gas/steam mixture can be provided under saturation conditions to be effective in cooking a food product as conveyed on the conveyor 18 by direct impingement of the gas/steam mix to the surface of a food product.

An apparatus in accordance with the present invention can be made by modifying or retrofitting a commercially available impingement oven to include a steam distribution system the basic functionality requirements of the present invention. Suitable commercially available impingement ovens can be obtained, for example, from APV Baker Inc. of Grand Rapids, Mich., under the trade names "Jet Sweep" or "Enerjet." Other suitable impingement ovens that can be modified are available from Sasib Company of Copenhagen, Denmark. Such impingement ovens may otherwise be originally manufactured to include a steam distribution system in accordance with the basic functionality requirements of the present invention.

Figure 7:
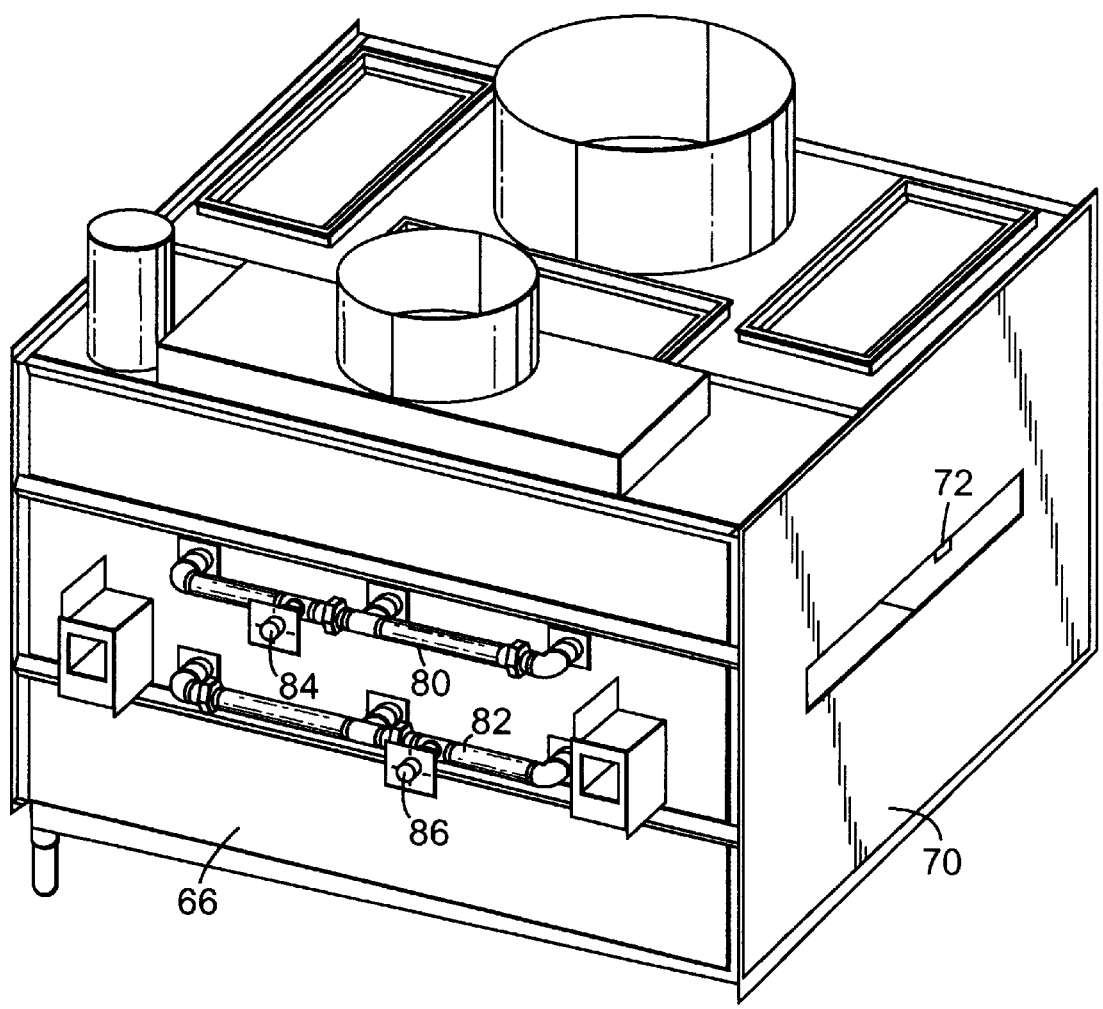
FIG. 7 is a rear perspective view of an internal oven chamber of one of the oven sections of the multi-section impingement oven of FIGS. 4–6 showing, in particular, upper and lower steam distribution manifolds for providing steam within the oven chamber, and in particular for each upper and lower nozzle within the oven chamber.

An impingement oven system is preferred that comprises a modified impingement oven of the type that is commercially available from APV Baker Inc. under the trade name "Jet Sweep." Any number of oven sections or modules of such an impingement oven can be modified to include a steam distribution system in accordance with the present invention, such as that illustrated in FIGS. 5, 7 and 8.

More particularly, for making a filled bagel product 10, a specific example of one preferred oven arrangement follows. Specifically, in this example the impingement oven system comprises eight cooking zones, with each zone defined by the cooking temperature and humidity provided in that zone. Like the construction shown in FIGS. 4–6, three oven sections 48 (each about four foot in length) along with a heated gas supply system comprise a module. Seventeen modules are arranged in line to provide the eight zones. The first two oven zones each comprise two modules and are connected with a steam distribution system for injecting steam into each impingement nozzle (both upper and lower) thereof. The next five zones each comprise two modules, but are not connected with the steam distribution system and no steam injection is provided in any of their oven chamber sections. The final zone comprises three modules that are also not connected with the steam distribution system so that no steam injection is provided in any of their oven chamber sections. A forty eight inch wide conveyor driven at a constant speed moves the filled bagel products through the entire oven length. Each oven section throughout both the steam and non-steam zones are otherwise structurally set up the same with four top and four bottom impingement nozzles. Temperature and humidity conditions within the steam zones, i.e. the first two baking zones, are preferably controlled by the heated gas and steam supplies to be at about 200 degrees dry bulb and 198 degrees wet bulb as measured on the gas flow return side of the oven module (i.e. as the mixture is exhausted from the oven chamber section). In the remaining zones, temperature and humidity are preferably at about 375 degrees dry bulb (no steam), measured on the gas flow return side. The gas/steam mixture velocity within the first two steam zones is preferably run at between about 400 to 800 feet/minute. The gas velocity within the remaining baking zones is preferably run at between about 800 to 1200 feet/minute. The conveyor is run at a constant speed so that the entire cooking process through all eight zones takes about six minutes. That includes about 1.4 minutes within the initial steam zones and about 4.6 minutes to run through the remaining baking zones.

Moisture is thus introduced as steam within the heated gas of the convective heat transfer mechanism. The steam is introduced within the heated gas prior to it being ejected from the heated gas supply nozzles that create heated the gas/steam jets or streams. Thus, by creating an effective steam environment, preferably as high as the level of saturation, within the heated gas prior to its ejection, an environment having a high water to gas ratio with highly saturated conditions can be focused at the food product surface. The particular advantage is that the steam is focused at the food product surface so that moisture at the food product surface is maximized while the steam levels within the overall baking chamber can be minimized. The high water to gas ratio environment is substantially provided at and about the food product without having to create a highly saturated environment within the entire baking chamber. In other words, appropriate conditions with respect to temperature and moisture can be created as a micro-environment of higher humidity near the product surface. Otherwise, the baking chamber does not necessarily have to experience highly saturated conditions throughout. This permits the high throughput and reduced baking dwell time advantages of impingement baking to be achieved while making a food product that advantageously achieves desired moisture related characteristics. Additionally, steam usage is minimized.

By delivering the steam and creating the high water to gas ratio environment near the product surface, there is no need to create a homogeneous environment of high humidity within the entire baking chamber. It is also possible to selectively provide the steam to select nozzles of the impingement oven. This creates greater flexibility to the oven design. For example, with a bagel product, steam may be introduced within the nozzles of the initial cooking segment of the oven to achieve desired results early on in the baking cycle, while other baking zones, such as downstream of an initial zone, may be otherwise controlled. This can be advantageously used to create high humidity zones in the micro-environment about a food product in only the desired zone or zones of one or more stages of an impingement oven. With greater flexibility in designing the impingement oven, greater flexibility in terms of generating food products with varied attributes, such as crust texture and surface sheen, can be achieved.

In operation of an impingement oven system in accordance with the present invention, such as illustrated in FIGS. 4–8 and described above, for baking a filled bagel product of the type shown in FIG. 1 and described above, it has been found that the injection of steam within both the upper and lower impingement nozzles of the early cooking zones can substantially affect baked product characteristics, such as the size and shape of the bagel product and its surface sheen. Moreover, the amount of steam used (that was monitored as a function of the steam pressure provided to the steam nozzles 100 and 102) was found to be directly related to product expansion and surface sheen and texture where steam is utilized in the early stages of baking (e.g. within the first two intensive cooking zones).

Generally, the higher that the percent of water based on volume is within the baking zones, the greater the product growth in its length and width dimensions with a decrease in height. Adequate humidity in these baking chambers is also important to the crust sheen that is developed as a result of the baking process. Thus, it is further beneficial to hold adequate moisture within the steam injected baking zones to increase the humidity within those zones. This is done by controlling the gas flow from within such zones.

By varying cooking temperatures and steam pressure to both sets of steam nozzles 100 and 102, described above, it was determined that the color of the bagel dough of the filled bagel product relates to the cooking temperature while surface sheen level relates to steam pressure. Table 1 below shows the results of a number of runs with varied temperatures and steam pressures.

TABLE 1

| Sheen Level | Run No. | Color compared to control/color standard | Temp. (F.) | Steam Pressure Entering Oven (psi) |
| --- | --- | --- | --- | --- |
| High | 1 | Much Lighter | 335 | 25–30 |
| High | 2 | Lighter | 355 | 25–30 |
| High | 3 | Control | 375 | 25–30 |
| High | 4 | Darker | 415 | 25–30 |
| Low | 5 | Darker | 415 | 8.5–11.5 |
| Low | 6 | Much Lighter | 335 | 8.5–11.5 |
| Low | 7 | Lighter | 360 | 8.5–11.5 |
| Low | 8 | Control | 385 | 8.5–11.5 |

For these runs, other operating conditions remained the same throughout each bake cycle through a two zone cooking system. Conditions were maintained as follows: in zone 1, the temperature was kept at 200 degrees F. for a cook time of 1.25 minutes while the gas flow was held by setting a constant fan rate; and, in zone 2, the temperature was varied as in Table 1 for a cook time of 4.75 minutes with a greater constant gas flow than in zone 1. In both zones, the gas flow was evenly split between the upper and lower impingement nozzles and the steam pressure to both was varied as set out in Table 1.

It is understood that an apparatus in accordance with the present invention can be any oven that has a baking chamber and that utilizes convective heat transfer for at least partially cooking a food product. In any design, a steam distribution system can be provided that injects steam into the convective heat transfer mechanism instead of into the environmental baking chamber. That is, air (or other carrier gas) is mixed with steam prior to the gas being utilized as the heat transfer carrier so that upon impingement of the gas/steam mix to a surface of the product, cooking of that surface within a moisture environment is effected. As above, for bagel products, a high moisture content environment is desired about the product dough at least during early stages of cooking. For other dough products, or other food products in general, it may be desirable to utilize lower moisture levels about the product. Moreover, the timing aspect may be different (e.g. the provision of a moisture environment at a later stage of cooking).

What is claimed is:

1. An apparatus for heating and cooking food products that utilizes convective heat transfer as a manner of providing heat to the food product, the apparatus comprising:

an oven chamber;

a support provided within the oven chamber for positioning a food product in the oven chamber for heating thereof;

an impingement nozzle for connection to a heated gas supply, the impingement nozzle including a receiving chamber within which heated gas can enter from the heated gas supply and that extends within the oven chamber for a length toward the support for the food product and including at least one fluid directional opening from which heated gas can be ejected toward a food product that is supported in position within the oven chamber; and a steam injector connectable to a steam supply, the steam injector including at least one opening that is in direct fluid communication with the receiving chamber of the impingement nozzle so that steam can be injected directly into the receiving chamber of the impingement nozzle, whereby, heated gas and steam can be separately provided at the same time to the receiving chamber of the impingement nozzle so that the heated gas and steam can mix together prior to being ejected from the fluid directional opening of the impingement nozzle toward the food product and the heated gas and steam mixture can be utilized for convective heat transfer for heating the food product.

2. The apparatus of claim 1, wherein the impingement nozzle comprises a plurality of fluid directional openings and that extends within the oven chamber for a length toward the support for the food product so that heated gas and steam can be ejected toward the food product from the plurality of directional openings, and the steam injector comprises a steam nozzle that extends within the receiving chamber of the impingement nozzle.

3. The apparatus of claim 2, wherein the impingement nozzle extends within the oven chamber for a length so that it overlaps the support for the food product sufficiently so that the food product can be heated.

4. The apparatus of claim 3, wherein the impingement nozzle is positioned vertically above the support and extends over the support.

5. The apparatus of claim 3, wherein the impingement nozzle is positioned vertically below the support and extends under the support.

6. The apparatus of claim 2, including a plurality of impingement nozzles having plural fluid directional openings and that extend within the oven chamber toward the support for the food product.

7. The apparatus of claim 6, wherein at least one impingement nozzle is positioned vertically below the support and extends under the support and at least one impingement nozzle is positioned vertically above the support and extends over the support.

8. The apparatus of claim 7, including plural steam injectors, wherein a steam nozzle extends within a receiving chamber of at least one impingement nozzle below and one impingement nozzle above the support so that steam can be provided within their respective receiving chambers.

9. The apparatus of claim 1, comprising a multi-sectional oven system having a plurality of oven chamber sections making up the oven chamber and the support comprises a means for moving food product from one oven chamber section to another.

10. The apparatus of claim 9, wherein a plurality of the oven chamber sections include at least one impingement nozzle having plural fluid directional openings that extend toward the means for moving the food product.

11. The apparatus of claim 10, including plural steam injectors, wherein a steam nozzle extends within a receiving chamber of at least one impingement nozzle within one oven chamber section and one impingement nozzle within another oven chamber section so that steam can be provided within their respective receiving chambers.

12. The apparatus of claim 9, further comprising a steam distribution system that is connectable to a steam supply and that interconnects with a steam nozzle of the steam injector of at least one oven chamber.

13. The apparatus of claim 12, including a plurality of impingement nozzles, wherein each impingement nozzle includes a plurality of fluid directional openings and each impingement nozzle extends within an oven chamber section for a length toward the means for moving the food product so that heated gas and steam can be ejected toward the food product from the plurality of directional openings, and each steam injector comprises a steam nozzle that is fluidically interconnected with the steam distribution system.

14. The apparatus of claim 13, wherein a plurality of oven chamber sections have at least one impingement nozzle extended therein and a steam nozzle that is fluidically interconnected with the steam distribution system.

15. The apparatus of claim 13, wherein a plurality of impingement nozzles and steam nozzles extend within at least one oven section and the plural steam nozzles within the one chamber section are fluidically interconnected together by way of a manifold of the steam distribution system.

16. The apparatus of claim 15, wherein plural impingement nozzles and steam nozzles extend from locations within an oven chamber section both vertically above and below the means for moving food product, and the plural steam nozzles above the means for moving food product are fluidically interconnected together by way of an upper manifold of the steam distribution system, the plural steam nozzles below the means for moving food product are fluidically interconnected together by way of a lower manifold of the steam distribution system, and the upper and lower manifolds are fluidically interconnected to at least one distribution conduit of the steam distribution system.

17. The apparatus of claim 16, wherein plural oven chamber sections each have a plurality of impingement nozzles and steam nozzles that extend both vertically above and below the means for moving food product, the plural steam nozzles above the means for moving food product in each oven chamber section being fluidically interconnected together by way of an upper manifold of the steam distribution system, the plural steam nozzles below the means for moving food product in each oven chamber section being fluidically interconnected together by way of a lower manifold of the steam distribution system, and the upper and lower manifolds of each oven chamber section being fluidically interconnected to at least one distribution conduit of the steam distribution system.

18. The apparatus of claim 17, further comprising steam control means for selectively regulating steam supply from one oven chamber section to another.

19. The apparatus of claim 18, further comprising steam control means for selectively regulating steam supply from the upper manifold to the lower manifold of at least one oven chamber section.

20. A method of heating a food product by convective heat transfer comprising the steps of:

supporting a food product within an oven chamber, wherein the oven chamber includes an impingement nozzle that is connected to a heated gas supply and that extends within the oven chamber for a length toward the support for the food product, the impingement nozzle having a receiving chamber with an inlet through which heated gas can enter from the heated gas supply and a plurality of fluid directional openings, and wherein the receiving chamber provides fluid communication only between the receiving chamber inlet and the fluid direction openings of the impingement nozzle, and a steam injector connected to a steam supply and in direct fluid communication with the receiving chamber, the steam injector including at least one opening;

supplying heated gas to the receiving chamber of the impingement nozzle;

injecting steam from the steam injector directly into the receiving chamber of the impingement nozzle wherein the steam injector extends within the oven chamber for a length toward the support for the food product while heated gas is separately supplied to the receiving chamber of the impingement nozzle wherein the steam injector extends within the oven chamber for a length toward the support for the food product so as to provide a heated gas and steam mixture;

heating the supported food product by convective heat transfer within a moisture environment by impinging the heated gas and steam mixture against at least a surface portion of the food product.

21. The method of claim 20, wherein the step of supplying heated gas comprises supplying heated gas to an impingement nozzle that has a plurality of fluid directional openings and that extends within the oven chamber for a length so that the heated gas and steam mixture can be ejected to impinge the food product from the plurality of directional openings, and the injecting step comprises injecting steam from a steam nozzle that extends within the receiving chamber of the impingement nozzle.

22. The method of claim 21, wherein the step of supplying heated gas comprises supplying heated gas to plural impingement nozzles within the oven chamber and the injecting step comprises injecting steam from plural steam nozzles that each extend within the receiving chamber of an impingement nozzle.

23. The method of claim 21, wherein the step of supplying heated gas comprises supplying heated gas to plural impingement nozzles at least one of which is vertically above and at least one of which is vertically below the supported food product and the injecting step comprises injecting steam from plural steam nozzles that each extend within the receiving chamber of an impingement nozzle above and below the supported food product.

24. The method of claim 21, wherein supplying step comprises supplying heated gas and the injecting step comprises injecting a sufficient quantity of steam for fully saturating the heated gas with the steam thereby forming a steam-saturated heated gas.

25. The method of claim 24, wherein the supporting step comprises supporting a dough product for impingement by the steam-saturated heated gas.

26. The method of claim 25, wherein the supporting step comprises supporting a bagel product for impingement by the steam-saturated heated gas.

27. The method of claim 21, wherein the supporting step comprises moving the food product within the oven chamber by a conveyor.

28. The method of claim 27, wherein the step of supplying heated gas comprises supplying heated gas to plural impingement nozzles at least one of which is vertically above and at least one of which is vertically below the supported food product, the injecting step comprises injecting steam from plural steam nozzles that each extend within the receiving chamber of an impingement nozzle above and below the supported food product, and the food product is moved through a space between at least two of the impingement nozzles by the conveyor.

29. The method of claim 28, wherein the oven chamber is comprised of multiple oven chamber sections, at least a plurality of which include plural impingement nozzles and steam injectors, and the conveyor moves the food product from one oven chamber section to another.

30. The method of claim 29, wherein the multiple oven chamber sections define at least two different cooking zones with different heat transfer capacities so that the food product is subjected to different heating zones as it is moved by the conveyor.

31. The method of claim 30, wherein the conveyor moves the food product through the multiple oven chamber sections at a constant speed.

32. The method of claim 31, wherein the injecting step comprises supplying steam from a steam distribution system that is fluidically connected to the upper and lower steam nozzles of the oven chamber sections by way of upper and lower manifolds and at least on distribution conduit.

33. The method of claim 32, comprising a method of cooking a dough product.

34. The method of claim 33, comprising a method of cooking a bagel product.

* * * * *

UNITED STATES PATENT AND TRADEMARK OFFICE
CERTIFICATE OF CORRECTION

PATENT NO. : 6,572,911 B1
DATED : June 3, 2003
INVENTOR(S) : Corcoran et al.

It is certified that error appears in the above-identified patent and that said Letters Patent is hereby corrected as shown below:

Column 16,
Line 61, after "chamber" "within" should be deleted and -- having an inlet through -- should be insert before "which".
Line 64, after "including" "at least one" should be deleted and -- a plurality of -- should be inserted before "fluid".
Line 65, "opening" should be changed to read -- openings -- insert before "from".
Line 67, after "chamber" insert -- , and wherein the receiving chamber provides fluid communication only between the receiving chamber inlet and the fluid direction openings of the impingement nozzle -- before ";and".

Column 17,
Line 4, after "impingement nozzle" insert -- wherein the steam injector extends within the oven chamber for a length toward the support for the food product -- before "so".

Signed and Sealed this

Twenty-seventh Day of July, 2004

JON W. DUDAS
*Acting Director of the United States Patent and Trademark Office*